Jan. 23, 1962 W. C. ELMORE ETAL 3,017,792
VIBRATORY DEVICE
Filed July 8, 1958 2 Sheets-Sheet 1
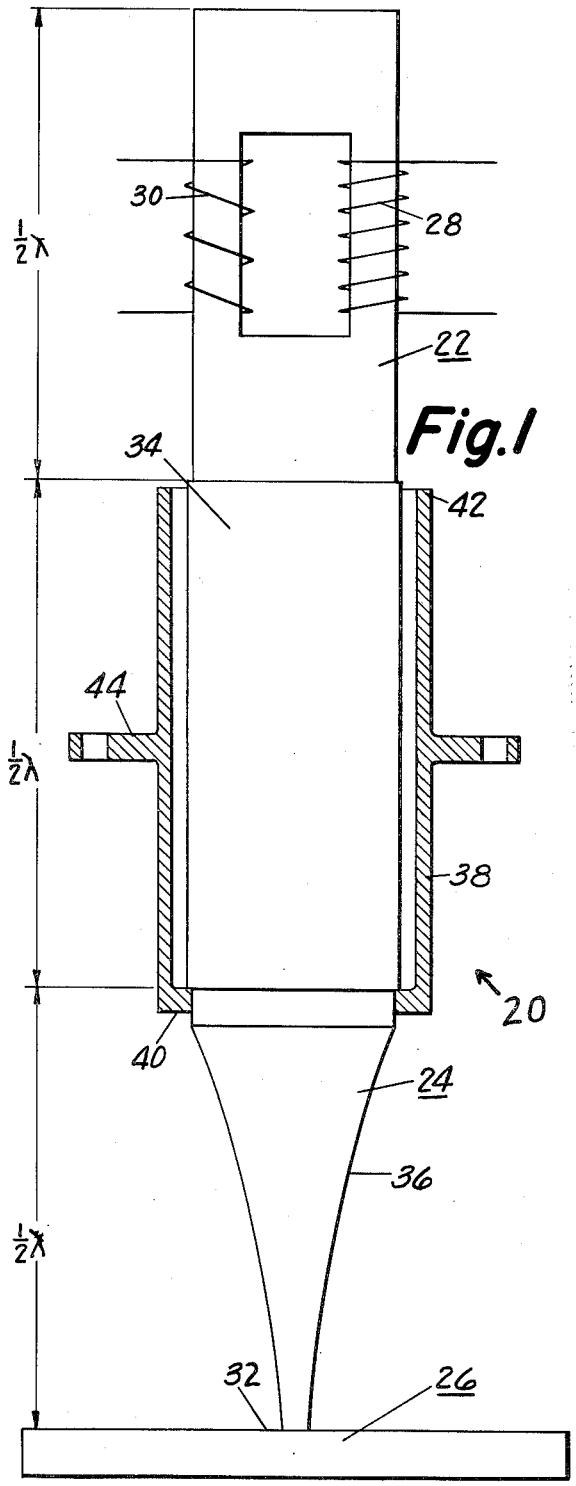
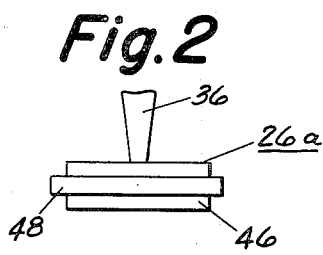
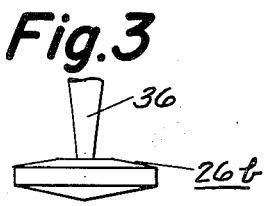
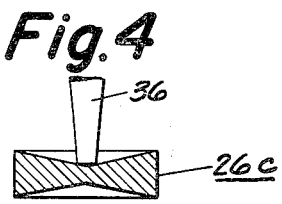
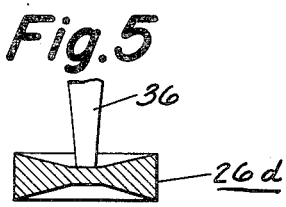
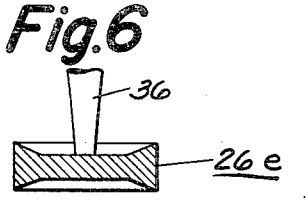
INVENTORS
WILLIAM C. ELMORE
CARMINE F. DE PRISCO
BY
Arthur H. Seidel
ATTORNEY Jan. 23, 1962 W. C. ELMORE ETAL 3,017,792
VIBRATORY DEVICE
Filed July 8, 1958 2 Sheets-Sheet 2
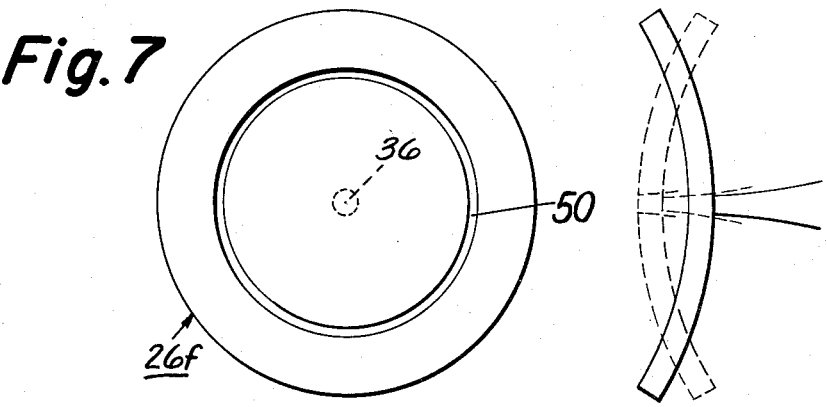
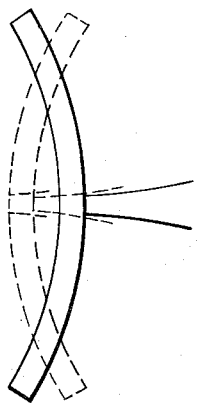
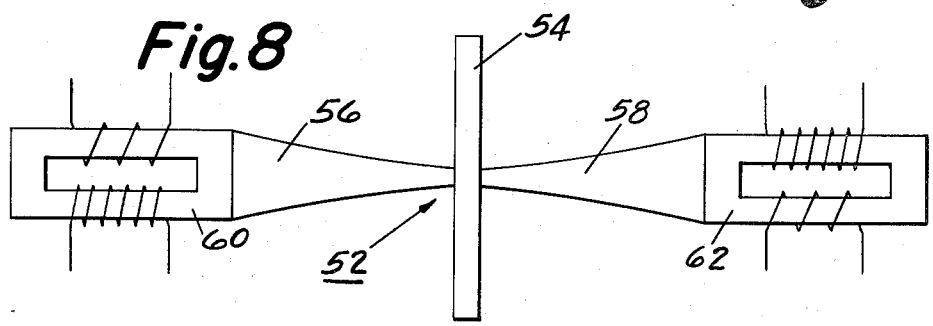
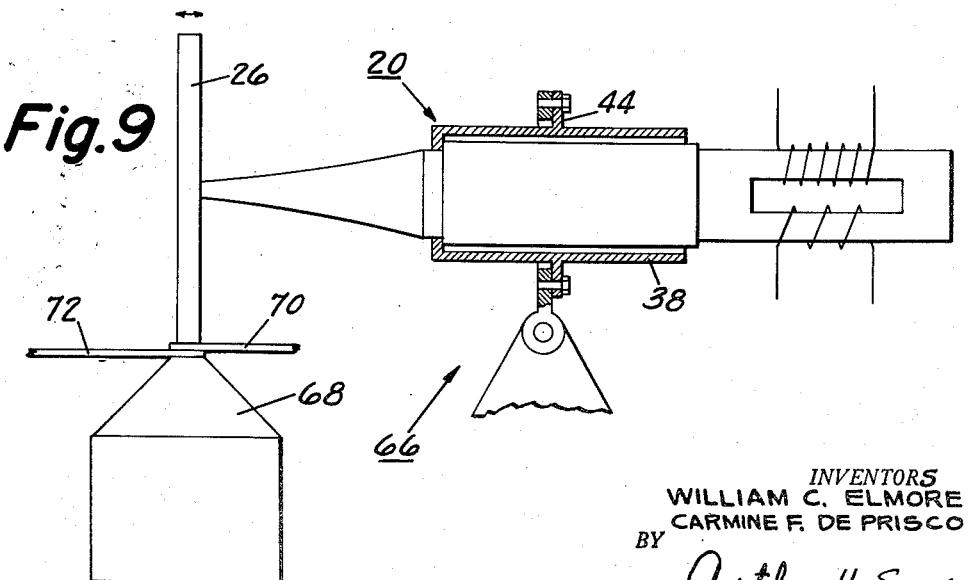
INVENTORS
WILLIAM C. ELMORE
CARMINE F. DE PRISCO
BY
Arthur H. Seidel
ATTORNEY United States Patent Office 3,017,792
Patented Jan. 23, 1962

3,017,792
VIBRATORY DEVICE
William C. Elmore, Los Alamos, N. Mex., and Carmine F. De Prisco, Glen Mills, Pa., assignors to Aeroprojects Incorporated, West Chester, Pa., a corporation of Pennsylvania
Filed July 8, 1958, Ser. No. 747,254
8 Claims. (Cl. 78—82)

The present invention is directed to a vibratory device and more particularly to vibrating circular plates having utility in ultrasonic applications such as vibratory welding.

There is provided by the present invention a resonant ultrasonic transmission line at whose end is a separately resonant vibratory power delivery tip, said tip being usable for example as a welding tip, whose dimensions, contrary to the usual practice heretofore in the design of ultrasonic equipment in which efficient delivery of vibratory energy at a high power level is desired, are not necessarily comparable with the end dimensions of the vibratory coupling member portion of the ultrasonic transmission line to which the aforesaid tip is attached. That is, by providing at the end of an ultrasonic transmission line a vibrating element such as the element used in the present invention which is in itself resonant (rather than providing for a tip which will vibrate along with the coupling member and is an integral part of that coupling member acoustically), one is enabled under certain conditions which will be explained to utilize tips having dimensions substantially greater than the end dimensions of the vibratory coupling member end portion to which they are attached without compromising the efficiency of operation of the said transmission line.

Moreover, with certain types of ultrasonic or vibratory welding equipment, such as some of the types described in patent applications filed in the name of James Byron Jones, William C. Elmore, and Carmine F. De Prisco, namely, Serial No. 579,780 filed April 23, 1956 for "Method and Apparatus Employing Vibratory Energy for Bonding Metals"; and Serial No. 579,779, filed April 23, 1956 for "Vibratory Seam Welder and Vibratory Seam Welding Process," we have found that the operation and utility of such equipment can be markedly enhanced by incorporation of the present invention. That is, by use of the present invention in the vibratory welding apparatus and process, it is possible when desired: (1) to increase and improve the clearance in back of the welding tip, (2) to reduce the number of requisite rotational revolutions of the welding tip and of the equipment associated with the tip for traversing a given linear distance of weldment, (3) to prevent bouncing contact between the welding tip and the weldment sheet, (4) to accomplish greater contact between the welding tip and the weldment, and (5) to minimize the possibility of erosion or wear of the welding tip.

Thus we have found that by using a resonant disk tip we can effect delivery of substantial amounts of power from a single small zone on the periphery thereof, avoid the difficulties associated with the effects of mass normally encountered when attempting to use the type of large tip which vibrates along with the coupling member and is an integral part of that coupling member acoustically, and secure the numerous advantages making use of a large-diameter tip (in relation to coupling-member-end diameter) desirable in many applications.

Furthermore, we have noted that there is a certain amount of energy storage involved in power delivery systems of the present invention. Thus, whether the resonant disk tip is made to roll or not, energy is taken off from only one small segment on the periphery; but since the rest of the disk is also vibrating, and this vibrating motion is coupled to the segment delivering power, there exists an effect analogous to a flywheel providing a higher Q to the system.

It should be noted that in a power delivery system such as, for example, vibratory welding, the vibratory energy is delivered from the edge of the disk and not from the face of the disk.

This invention has as an object the provision of a novel ultrasonic vibratory device.

This invention has as another object the provision of an ultrasonic vibratory device in which there is substantial clearance behind the delivering tip of the device.

This invention has as another object the provision of a vibratory device which may be rotated, and which traverses a given linear distance with a relatively small number of revolutions.

This invention has as yet another object the provision of a vibratory device which may be rotated upon a workpiece and which achieves secure engagement with the workpiece while being rotated thereon.

This invention has as yet another object the provision of a vibratory device for delivering vibratory energy at high power levels to a workpiece while minimizing penetration or gouging of the workpiece by the vibratory device.

This invention has as still a further object the provision of a novel vibratory welder.

Other objects will appear hereinafter.

For the purpose of illustrating the invention there is shown in the drawings forms which are presently preferred; it being understood, however, that this invention is not limited to the precise arrangements and instrumentalities shown.

FIGURE 1 is a longitudinal view of one embodiment of the vibratory device of the present invention.

FIGURE 2 is a fragmentary edge view of the tip portion of another embodiment of the vibratory device of the present invention.

FIGURE 3 is a fragmentary edge view of the tip portion of another embodiment of the vibratory device of the present invention.

FIGURE 4 is a fragmentary sectional view of the tip portion of another embodiment of the vibratory device of the present invention.

FIGURE 5 is a fragmentary sectional view of the tip portion of another embodiment of the vibratory device of the present invention.

FIGURE 6 is a fragmentary sectional view of the tip portion of another embodiment of the vibratory device of the present invention.

FIGURE 7 is an end view taken from the free face of yet another modified embodiment of the tip portion of the present invention.

FIGURE 7a illustrates the manner in which the tip portion vibrates in one embodiment of the present invention.

FIGURE 8 is an elevational view of yet another embodiment of the vibratory device of the present invention.

FIGURE 9 is an elevational view of a vibratory welder in accordance with the present invention.

While applicants' invention in part concerns tips and the use of tips whose dimensions are not necessarily comparable with the end dimensions of the vibrating couper member to which they are attached, their invention is primarily concerned with the fact that the tips are resonant and that they are in the form of circular plates. A theoretical discussion of the frequencies and modes of vibration of circular plates is presented in the book of H. F. Olson entitled Acoustical Engineering (D. Van Nostrand & Company, Inc., 2d edition, 1947, pages 58–62, or in the 1957 revision at pages 63–66). This referenced discussion covers theory involved in the vibration of, for example, a circular clamped (at the edges) plate, a circular free plate, a circular plate supported at the center (umbrella mode), and a circular plate supported at the outside. However, the resonant circular plate used in connection with the present invention is not utilized under any of these conditions but is a center-driven disk, which is a new type which has not been discussed in the classical literature. That is, the tip of the coupler which carries the disk is attached to the center of the disk, as by a metallurgical joint, whereby the disk vibrates in a normal mode of vibration symmetrical about its axis and energy is removed from the resonant disk tip from a small peripheral segment thereof and not from the entire periphery of the disk or from the faces of the disk. We have found that disks driven in this manner, when constructed according to certain dimensional requirements and limitations and when operated at certain frequencies and in certain modes of vibration, are entirely practical for some ultrasonic power delivery systems and make efficient component parts thereof, even though they are loaded: (a) statically, as a wheel on a vehicle is loaded by the weight or force on its axle, and (b) acoustically, at a small segment on the periphery and not uniformly over the entire periphery or over the entire face (whereas the theoretical disks mentioned above are not loaded at all, which means they are not delivering energy as to a weldment).

As to the limitations regarding modes of vibration of the circular plate or resonant disk in a power delivery system, while Olson in the work cited above shows a number of modes of vibration of circular plates, and while theoretically any mode in which there is a vibratory loop or active zone at the outer periphery of the disk should be possible of use, at least to some extent, we have found that the mode having one nodal circle at approximately the center of the disk's face and a vibratory loop at the center of the disk as well as a vibratory loop at the outer periphery of the disk is to be preferred. Thus, such a mode of vibration of the disk offers a convenient attachment point or zone at its center for the end of the coupler to which it is attached (there then exists a condition of a vibratory loop at the coupler end contacting a vibratory loop of the disk, loops being active energy regions) and offers an active vibratory loop area all around its periphery which is desirable for efficient power delivery and for the self-storing of energy which has been mentioned.

Thus we have found that other modes of vibration do not offer convenient attachment points for insuring desirable vibration conditions, or are less efficient, as, for example, in providing a lesser amplitude of vibration, or have relatively inactive (nodal) zones at the periphery, or present unsymmetrical modes of vibration about the axis of the disk so as to be less desirable for rolling as in seam welding, for example, and without the energy self-storing advantage, or have other deficiencies.

As to the dimensional requirements for construction and use of a resonant disk as part of the present invention, it will be apparent to anyone skilled in the art that, for efficient operation and to minimize energy losses, the disk should be dimensioned so as to vibrate at the same frequency as does the vibratory system to which it is attached; i.e., that the transducer, coupling member, and disk should all vibrate at the same frequency. We have found that it is possible to calculate such dimensions after the equation of Olson for a circular free plate with one nodal circle, which is the equation which we prefer (even though our embodiment is not a circular free plate but a circular center-driven plate), such equation being:

$$f = \frac{0.412 t}{R^2} \sqrt{\frac{Q}{\rho(1-\sigma^2)}}$$

where $f$ is the frequency, $t$ is the thickness of the plate in centimeters, R is the radius of the plate in centimeters, $\rho$ is the density in grams per cubic centimeter, $\sigma$ is Poisson's ratio, and Q is Young's modulus in dynes per square centimeter.

It will thus be seen that the frequency of vibration of the circular plate has a relation not only to the thickness and radius of the plate or disk, but also to the physical properties of the material of which the disk is made. In steel, for example, Poisson's ratio is 0.29, and the longitudinal velocity of sound in steel (said velocity being equal to the square root of Young's modulus or the modulus or elasticity divided by the density) is $5.1 \times 10^5$ centimeters per second. Then, for a disk of steel intended to be operated at a frequency of 15,000 cycles per second:

$$t = R^2 (68.805 \times 10^{-3})$$

For example, from the aforesaid equation it may be calculated that, for a disk of steel vibrating at a frequency of 15,000 cycles per second so as to have one nodal circle, where the disk has a radius of 2 centimeters it should have a thickness of 0.2752 centimeter; with a radius of 3 centimeters it should have a thickness of 0.6192 centimeter; with a radius of 4 centimeters it should have a thickness of 1.009 centimeters; with a radius of 5 centimeters it should have a thickness of 1.720 centimeters; with a radius of 6 centimeters it should have a thickness of 2.477 centimeters; with a radius of 7 centimeters it should have a thickness of 3.371 centimeters; with a radius of 8 centimeters it should have a thickness of 4.403 centimeters; etc.

However, and of importance, we have found that there are certain size limitations, so that the calculated dimensions of radius and thickness are not always applicable. Thus, at very low frequencies the diameter of the disk becomes useless for the purpose intended, while at very high frequencies the thickness of the disk becomes so great that the disk is useless for the purpose intended, e.g., power delivery. It will be evident that the minimum thickness for the resonant disk should be such that the thickness is great enough to transmit acoustic or vibratory power. While the resonant disk should be thin, because the thinner it is within limits the more predominant is the design frequency, yet it may not be so thin that it has inadequate restoring force for vibration and to permit the transmission of power.

In a practical application, when construction of a disk of a given radius is desired for use in a particular situation, such as a specific vibratory welding situation involving specific machine design requirements, to vibrate at a pre-selected resonant frequency (being the frequency of the transducer-coupling system to which it is to be attached), the given values for radius and frequency and material properties are substituted in the classical equation given above, and the value for thickness of the disk is then obtained.

However, we have found that the classical equation is not always satisfactorily adequate for obtaining the preferred dimensions of the disk, and that a minor amount of experimentation is sometimes necessary to arrive at appropriate dimensions which will enable the disk to transmit power at the design frequency. For example, in providing a disk of steel to vibrate at 15,000 cycles per second and to have a radius of 2.125 inches, it was found that the classical equation provided a thickness which, in relation to the radius, resulted in the vibration of the disk at a frequency of 13,730 cycles per second when the disk was center-driven instead of 15,000 cycles per second. It was necessary to machine the disk so as to make its radius one-eighth inch smaller in order to have it transmit power when center-driven at the desired 15,000 cycles per second. On the other hand, disks of aluminum and of steel have been made which were dimensioned according to the classical equation for operation at 50,000 cycles per second and which operated at the design frequency when being center-driven without need for subsequent adjustment in either radius or thickness dimensions.

In any event, the radius of the disk must be considerably greater than its thickness; how much greater it can be is indicated by the classical equation together with a minor amount of testing under operating conditions and occasional adjustment such as is entirely within the skill of one working in this art. Such adjustment is made to insure predominance of the desired resonant frequency without other interacting resonant frequencies when the disk is center-driven (since if other interacting resonant frequencies are present they will absorb some of the power and hence make the system less efficient). The relationship between the radius and the thickness dimensions of the disk permits the tips of the present vibratory devices to be furnished in a wide variety of dimensions. Disks of the proper dimensions may generally be obtained in the frequency range of from about 3,000 cycles per second to about 100,000 cycles per second. Applicants have designed resonant disks made of various metals according to the present invention which were entirely successful in operating at various frequencies in the inaudible range from 15,000 cycles per second to 60,000 cycles per second, under vibratory welding conditions.

Resonant disks may be made of materials such as metal having desirable acoustical properties, such as metals including the following: aluminum, molybdenum, Monel metal, nickel, steel, titanium, etc.

As to the junction between the end of the coupler member and the center of the disk, for optimum vibration and operation the contact area should be the minimum area which will give adequate mechanical strength of the system under power delivery conditions, and a metallurgical joint between coupler end and disk center, such as a brazed or a threaded-and-brazed joint, is preferred rather than other types of joinder. For example, we have found that a 0.4-inch diameter circular contact area may be successfully used for coupling to a 20,000 cycles per second resonant disk, and for coupling to a resonant disk of not more than two inches in diameter a 0.25-inch diameter circular contact area is satisfactory.

One embodiment of the vibratory device of the present invention is shown in FIGURE 1 and is designated as 20.

The vibratory device 20 comprises the magnetostrictive transducer 22, the coupler 24, and the resonant tip 26.

The magnetostrictive transducer 22 is of conventional construction and comprises a laminated core of nickel, nickel-iron alloy, Permendur (an iron-cobalt alloy), Alfenol (an aluminum-iron alloy), or other magnetostrictive material, properly dimensioned to insure axial resonance with the frequency of the alternating current applied thereto so as to cause it to decrease or increase in length according to its coefficient of magnetostriction. The detailed construction of a suitable magnetostrictive transducer, which in the illustrated embodiment comprises a nickel stack, is well known to those skilled in this art and as above-indicated does not form a part of the present invention, and accordingly no detailed description of its construction will be made herein.

The magnetostrictive transducer 22 includes the polarizing coil 28 and the excitation coil 30. The desirability of magnetically polarizing the magnetostrictive transducer 22 by means of polarizing coil 28 in order for the metal laminations in the magnetostrictive transducer 22 to efficiently convert the applied RF energy from excitation coil 30 into elastic vibratory energy will be readily understood by one skilled in the art.

It will be appreciated by those skilled in the art, that in place of the magnetostrictive transducer 22 shown in the drawings, other known types of transducers may be substituted. For example, electrostrictive or piezoelectric transducers, made of barium titanate, quartz crystals, lead titanate, lead zirconate, etc., may be utilized.

The magnetostrictive transducer 22 is metallurgically bonded in end-to-end contact as by silver brazing or the like to the coupler 24. The coupler 24 may be any one of the wide variety of couplers known to the art. In the illustrated embodiment the coupler 24 comprises the cylindrical coupling member 34 formed of solid steel and a second coupler member 36 which comprises a tapered coupler portion and an integral cylindrical portion, with the cylindrical portion being integral with or metallurgically bonded or screw-connected in end-to-end contact to the cylindrical coupler member 34. For the delivery of maximum power the tapered coupler portion of the second coupler bar may be curved so as to have a taper that is an exponential function of its length and satisfies the following relation:

$$S = S_0 e^{-2Tl}$$

where $S_0$ is the reduced area at the end 32, S is the area at the cylindrical portion of such second coupler bar 36, T is a constant for the taper, and $l$ is the length of the tapered coupler. This equation is set forth at page 163 of Piezoelectric Crystals and Ultrasonics, by Warren P. Mason, published in 1950 by Van Nostrand Company, and the design of the tapered portion is discussed therein, including a drawing thereof which Mason designates as a "Metal 'horn' for obtaining a large strain in a metal sample."

The cylindrical portion of the second coupler bar 36 is supported by support mount 38. The support mount comprises a cylindrical metal shell, such as a cylindrical steel shell or a shell of other suitable resonant material. The shell 38 has a length of one-half wavelength according to the metal used at the applied frequency, or a length equal to a unit number of one-half wavelengths. In the illustrated embodiment, the shell 38 has a length equal to a single one-half wavelength. The shell 38 surrounds the cylindrical coupling bar 34, being concentric therewith and spaced therefrom. At the end of the shell 38 which is furthest from the magnetostrictive transducer 22 there is a radially inwardly disposed flange 40 which is metallurgically bonded to the cylindrical portion of the second coupler bar 36. The end 42 of support mount 38 opposite from the flange 40 is free from any attachment, and accordingly when the vibratory device 20 is vibrating a true node will develop in the support mount 38 at flange 44, which is one-quarter wavelength distant from the free end 42 of support mount 38. The flange 44 is supported by exterior support means (not shown), such flange 44 projecting radially beyond the cylindrical shell portion of the support mount 38.

The support mount 38 is desirable for many applications, but in many applications the vibratory device 20 may be utilized without any mount, and other mounts from the mount shown in the drawings may be used in conjunction with the vibratory device 20.

In the illustrated embodiment the magnetostrictive transducer 22, the cylindrical coupling member 34 and the second coupler member 36 are each dimensioned to have a length equal to one-half wavelength, and are designed to be resonant at the applied operating frequency so as to deliver the maximum amount of power, and to have the joints, namely the joint between the magnetostrictive transducer 22 and the cylindrical coupling bar 34, the joint between the cylindrical coupling bar 34 and the second coupler bar 36, and the joint between the second coupler bar 36 and the resonant tip 26, positioned at a loop of the wave motion whereby the joints of the vibratory device 20 will not be appreciably stressed.

The resonant tip 26 comprises a circular disk acoustically driven at its center.

The resonant tip 26 should in a preferred embodiment be dimensioned according to the equation heretofore provided to vibrate at the design frequency so as to provide a circular plate having one nodal circle within its periphery with a vibratory loop at its center and a vibratory loop at its periphery. We prefer to operate within the frequency range of 3,000 cycles per second to 100,000 cycles per second. Within this range, we have found operation with disks having one nodal diameter to be most desirable, as generally being most efficient for power delivery situations, although disks having other modes of vibration may be used, being dimensioned according to the equation given with a change in the numerical portion preceding the thickness in the numerator, as given by Olson in the cited reference. As has been mentioned, dimensioning may under some circumstances require modest adjustment to insure optimum operation.

The resonant tip 26 of the embodiment of FIGURE 1 comprises a circular disk, having a uniform thickness throughout.

The subject invention also comprises tapered resonant tips, and tips comprising a plurality of offset circular disk portions integrally formed as a single tip.

Persons having skill in acoustical physics may modify the equation heretofore set forth to cover the design of tapered circular disks or disks comprising a plurality of integral circular portions. The equations for many tapered structures have been fully worked out, so that the modification of a circular disk to one of the latter type disks is not beyond the skill of one having ordinary skill in this art, such equations enabling one to calculate with a fair degree of precision the precise dimensions of the taper. We have found that disks of the latter type, when center-driven in accordance with the vibratory device of the present invention perform analogously to circular disks, with occasional minor differences, the selection of taper being made to stabilize performance frequency as a function of static force. FIGURES 2 through 6 reveal modified resonant tips which may be used in the vibratory device of the present invention and whose dimensions may be closely calculated by adjusting the equation for a circular free plate to compensate for the taper or other modification in shape.

FIGURE 2 reveals a resonant tip 26a comprising a plurality of integrally formed circular disks, namely the relatively thick and relatively narrow disk 46 and the relatively thin and relatively wide disk 48 (the resonant tip 26a being integral), the disk 48 comprises an integral projection from the disk 46.

The resonant tip 26b shown in FIGURE 3 comprises an integral circular disk having a positive taper. Thus, the resonant tip 26b is thicker at its center than at its edge. The degree of taper may be a straight taper of an exponential taper depending upon the particular design.

FIGURES 4, 5 and 6 illustrate resonant tips having a negative taper, namely tips whose peripheral thicknesses exceed their central thicknesses.

In the resonant tip 26c shown in FIGURE 4 the tip has a negative taper (which may be a straight taper or an exponential taper) going from its peripheral edge to its center.

In the resonant tip 26d shown in FIGURE 5 the tip has a negative taper for an appreciable peripheral portion with a relatively small central portion of uniform thickness.

In the resonant tip 26e shown in FIGURE 6, the tip has a negative taper for a relatively small peripheral portion and has a relatively large central portion of uniform thickness.

The resonant tips shown in FIGURES 2 through 6 have a thickness limitation since such tips, like the other tips of the vibratory device of the present invention, must remain elastic, in order to vibrate in the desired manner.

FIGURE 7 illustrates a resonant tip embodiment in which the tip 26f is provided with the circular groove 50 at the nodal region. In all other respects the resonant tip 26f resembles the resonant tip 26 shown in FIGURE 1. We have found that the provision of the groove 50 may prove advantageous in stabilizing the vibratory motion of the resonant tip 26f.

FIGURE 7a illustrates the approximate vibratory motion of the tip of the present invention when it vibrates according to the mode of vibration providing one nodal diameter. Vibratory loop and nodal areas are clearly shown.

FIGURE 8 reveals a vibratory device which may be used when it is desired to put very high power levels of vibratory energy into workpieces. In the vibratory device 52 shown in FIGURE 8, the circular resonant tip 54 is acoustically driven at the center of its faces by the respective couplers 56 and 58. The couplers 56 and 58 may comprise any of the couplers used in ultrasonic devices, and in the illustrated embodiment comprise tapered bars.

A magnetostrictive transducer 60 is axially secured to coupler 56 and a magnetostrictive transducer 62 is axially secured to coupler 58. The magnetostrictive transducers 60 and 62 may be identical to the magnetostrictive transducer 22. The magnetostrictive transducer 60 and coupler 56 and the magnetostrictive transducer 62 and coupler 58 are dimensioned identically.

By operating the magnetostrictive transducers 60 and 62 out of phase, in the manner of a two-man saw, the circular resonant tip 54 may be operated at higher power levels than is feasible with a single magnetostrictive transducer.

In FIGURE 9 there is shown the application of the vibratory device of the present invention in a welder, namely a spot welder.

The conditions under which welding may be effected with the vibratory device of the present invention are those conditions which have heretofore been developed in connection with vibratory welding. These conditions may be summarized as follows:

Welding is effected under a clamping force sufficient to hold the metals being welded in firm contact at the intended weld interface.

The clamping force may thus be varied over a wide range. Thus, in a preferred embodiment, the maximum clamping forces need not produce an external deformation [1] of more than about ten percent in weldments effected at room or ambient temperatures. In many cases the extent of deformation is appreciably below 10% and in some instances may be virtually absent altogether. The minimal clamping force to be used in the process of this invention constitutes a force sufficient to maintain the metals being welded in regulated alignment and firm contact, e.g. contacting each other so that the weld may be effected by the application of vibratory energy.

The range of operative clamping pressures which may be employed may be readily ascertained by the user of the process. In all cases the clamping force must be sufficient to effect coupling between the metals being welded and the source of vibratory energy, so that such vibratory energy may be transmitted to the metals.

While the range of 59 to 300,000 cycles per second is operative for vibratory welding, practical limitations as to the size of the tip of the present invention make operation within the range 3,000 to 100,000 cycles per second, and preferably 10,000 to 90,000 cycles per second desirable with the vibratory welding device of the present invention. It should be noted, however, that operation below about 15,000 cycles per second may be objectionable to the ear, as being in the audible range.

Welding may be and in many instances is initiated at room temperatures or ambient temperatures without the application of heat.[2] If desired, welding may also be initiated at elevated temperatures below the fusion temperature (melting point or solidus temperature of any of the pieces being bonded).[3] Thus, heating the metals to be

---

[1] By deformation is meant the change in dimensions of the weldment adjacent the weld zone divided by the aggregate thickness of the weldment members prior to welding; result multiplied by 100 to obtain percentage.
[2] The weldment may be warm to the touch after the weld due to the application of the elastic vibratory energy.
[3] The temperatures to which the foregoing statements refer are those which can be measured by burying diminutive thermocouples in the weld zone prior to welding, as well as the temperatures which can be estimated or approximated from a metallographic examination of a cross-section of a vibratory weld in the ordinary magnification range up to about 500 diameters.

welded prior to, and/or during welding to a temperature below their fusion temperature may, in some cases, facilitate the case of welding and lower the power requirements and/or time requisite to achieve welding.

The welding process may be applied to a variety of metals and alloys, examples of which include: aluminum to aluminum; aluminum alloy to aluminum alloy; copper to copper; aluminum alloy to copper; steel to steel; aluminum alloy to steel; etc.

Welding is accomplished within a wide time range, such as a time range of between about 0.001 second to about 6.0 seconds, with welding under most normal conditions being effected during a time interval of from several hundredths of a second to several seconds.

The welding of most metals can be effected in the ambient atmosphere. However, the process comprehends welding under vacuum conditions or in selected conditions such as atmospheres comprising an inert gas. Furthermore, while the welding process may be effected with metals, such as aluminum, without the extensive precleaning required to effect satisfactory welding by other methods, a degree of precleaning and surface treatment may prove advantageous in the welding of many metals. It is desirable prior to effecting welding in accordance with the present invention to remove surface contaminants, such as hydrocarbon and other lubricants and the like.

Referring to FIGURE 9 the vibratory welder 66 shown therein comprises the vibratory device 20 and the anvil 68. The anvil 68 is provided with a flat uppermost surface and is juxtaposed to and spaced from the resonant tip 26.

The workpieces 70 and 72 which undergo welding comprise pieces of sheet metal disposed between the resonant tip 26 and the anvil 68.

The workpieces 70 and 72 are maintained in regulated alignment and firm contact due to the force exerted on them by their engagement with the resonant tip 26. Such force may be supplied by suitable mechanical means, such as spring means, compressed air cylinder means, hydraulic cylinder means, and the like, engaged with the force insensitive mount 38 at the flange 44 thereof. The direction of vibration of the resonant tip 26 is shown by the double-headed arrow disposed above the resonant tip 26 in FIGURE 9. Welding is effected between the metal workpieces 70 and 72 under the conditions heretofore set forth by introducing elastic vibration from the resonant tip 26 to the workpiece 70, said elastic vibration including a component parallel to the interface between the workpieces 70 and 72 being bonded, the resonant tip 26 being vibrated in the direction of the double-headed arrow on the uppermost surface of the workpiece 70 while the aforesaid clamping force is being applied.

For example, two 0.032 inch sheets of aluminum alloy were welded together using the vibratory welder 66, when the same was operating at a frequency of 20,000 cycles per second, using an input power of 400 watts, a clamping force of 125 pounds and a welding time of one second. Weldments were obtained using welders operated at 15,000 cycles per second and 20,000 cycles per second under similar conditions with a wide variety of metals up to sheet thicknesses of 0.10 inch for the thinnest metal workpiece undergoing welding under substantially similar conditions to those set forth for the welding of the two pieces of 0.032 inch, with higher power levels being used for the thicker workpieces. All of these welds were initiated at room temperature.

The vibratory welder 66 may also be used as a seam welder. Thus, the resonant tip 26 may be rotated by suitable mechanical means in respect to either moving or stationary metal workpieces. To effect seam welding, similar conditions of force and power are utilized as are utilized in respect to spot welding.

The rate of seam welding will be dependent upon the nature and dimensioning of the vibratory welding equipment, upon operating force and power, and upon the nature of the metal workpieces undergoing welding. With a welder operated at 20,000 cycles per second on 0.032 inch pure aluminum workpieces, a seam welding speed of 200 inches per minute was maintained by rotating the resonant tip 26, the tip 26 being applied to the workpieces undergoing welding under a force of about 150 pounds.

Using a force in the range of 1 pound to 20 pounds, with the welder operating at 50,000 cycles per second, a power level of 15 to 100 watts, seam welds were made in foils of 0.0017 inch to 0.003 inch of aluminum at seam welding speed of 200 inches per minute, with welding being initiated at room temperature.

The present invention may be embodied in other specific forms without departing from the spirit of essential attributes thereof and, accordingly, reference should be made to the appended claims, rather than to the foregoing specification as indicating the scope of the invention. For example, while the present invention has been described in connection with its attachment to contoured tapered couplers, couplers having straight tapers or wedge shapes, or couplers having the form of cylindrical rods or tubes, and couplers having stepped configurations, may also be used in connection with the disk tip of the present invention, all of these coupler forms being known to the art and presenting somewhat different vibratory amplitude conditions at the coupler end as is well known to the art.

We claim:

1. A vibratory device comprising means for generating vibratory energy of a predetermined frequency and a tip comprising a circular plate for delivering vibratory energy from an edge surface thereof to a workpiece, said tip being coupled to said means for generating vibratory energy solely at the center of one of the faces of said plate, with said tip having a sufficient radial dimension and thickness to be resonant at said predetermined frequency and so as to vibrate in a normal mode of vibration about its axis.

2. A welding device for welding together the contacting surfaces of a plurality of metal members which includes a tip comprising a circular plate for delivering vibratory energy from an edge surface thereof which engages the metal members undergoing welding, support means for supporting the metal members undergoing welding juxtaposed to and spaced from said edge surface of said plate, means for generating elastic vibration of a predetermined frequency comprising an elastic vibratory component in the tangent plane of the edge surface which engages metal members undergoing welding, said plate being coupled to said means for generating elastic vibration solely at the center of one of the faces of said plate, with said tip having a sufficient radial dimension and thickness to be resonant at said predetermined frequency and so as to vibrate in a normal mode of vibration symmetrically about its axis.

3. A welding device in accordance with claim 2 said circular plate having a uniform thickness along its entire radial dimension.

4. A welding device in accordance with claim 3 in which the thickness of the plate and the radius of the plate are related to the predetermined frequency in accordance with the following equation:

$$f = \frac{.412t}{R^2}\sqrt{\frac{Q}{\rho(1-\sigma^2)}}$$

where $f$ is the frequency, $t$ is the thickness of the plate in centimeters, R is the radius of the plate in centimeters, $\rho$ is the density in grams per cubic centimeter, $\sigma$ is Poisson's ratio, and Q is Young's modulus in dynes per square centimeter.

5. A welding device in accordance with claim 2 in which the maximum thickness of the plate is less than one-fourth the radius of the plate, and the plate has sufficient thickness so as to possess restoring force.

6. A welding device in accordance with claim 2 in which the tip includes a single nodal circle spaced from its peripheral edge.

7. A welding device in accordance with claim 2 in which the circular plate is of non-uniform thickness.

8. A vibratory device comprising means for generating vibratory energy of a predetermined frequency, a tip, and coupler means connecting said tip and said means for generating vibratory energy, with said tip comprising a plate for delivering vibratory energy from an edge surface thereof to a workpiece, said coupler means being joined to said tip at the center of one of the faces of said tip, with the diameter of said tip being larger than the diameter of the end of the coupler to which said tip is joined and said tip being of a sufficient size to be resonant at said predetermined frequency.

References Cited in the file of this patent

UNITED STATES PATENTS

| | | |
|---|---|---|
| 568,043 | Reinhart | Sept. 22, 1896 |
| 592,768 | Einfeldt | Nov. 2, 1897 |
| 1,380,869 | Fay | June 7, 1921 |
| 2,050,026 | Tarbox | Aug. 4, 1936 |
| 2,222,906 | Hentzen | Nov. 26, 1940 |
| 2,481,087 | Crise | Sept. 6, 1949 |
| 2,573,168 | Mason | Oct. 30, 1951 |
| 2,651,148 | Carwile | Sept. 8, 1953 |
| 2,680,333 | Calosi | June 8, 1954 |
| 2,704,333 | Calosi et al. | Mar. 15, 1955 |
| 2,707,821 | Sowter | May 10, 1955 |
| 2,723,386 | Camp | Nov. 8, 1955 |
| 2,748,298 | Calosi et al. | May 29, 1956 |
| 2,792,674 | Balamuth et al. | May 21, 1957 |
| 2,804,725 | Dench | Sept. 3, 1957 |
| 2,891,178 | Elmore | June 16, 1959 |
| 2,891,180 | Elmore | June 16, 1959 |

FOREIGN PATENTS

| | | |
|---|---|---|
| 1,087,439 | France | Aug. 25, 1954 |
| 1,087,440 | France | Aug. 25, 1954 |

OTHER REFERENCES

"Ultrasonic Welding Bunts Bigger Game," American Machinist, McGraw-Hill, December 29, 1958, pages 51 and 52.